(12) United States Patent
Jacobson et al.

(10) Patent No.: US 10,432,936 B2
(45) Date of Patent: Oct. 1, 2019

(54) APPARATUS AND METHODS FOR PERCEPTUAL QUANTIZATION PARAMETER (QP) WEIGHTING FOR DISPLAY STREAM COMPRESSION

(71) Applicant: QUALCOMM Incorporated, San Diego, CA (US)

(72) Inventors: Natan Haim Jacobson, San Diego, CA (US); Vijayaraghavan Thirumalai, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 15/481,228

(22) Filed: Apr. 6, 2017

(65) Prior Publication Data

US 2017/0302932 A1    Oct. 19, 2017

Related U.S. Application Data

(60) Provisional application No. 62/322,730, filed on Apr. 14, 2016.

(51) Int. Cl.
*H04N 19/124* (2014.01)
*H04N 19/115* (2014.01)
(Continued)

(52) U.S. Cl.
CPC ......... *H04N 19/124* (2014.11); *H04N 19/115* (2014.11); *H04N 19/152* (2014.11);
(Continued)

(58) Field of Classification Search
None
See application file for complete search history.

(56) References Cited

U.S. PATENT DOCUMENTS

2010/0202513 A1*  8/2010  Arakawa .............. H04N 19/172
                                                    375/240.03
2013/0077676 A1*  3/2013  Sato .................... H04N 19/176
                                                    375/240.03
(Continued)

FOREIGN PATENT DOCUMENTS

EP             2868084 A1     5/2015
WO      WO-2013109838 A1     7/2013
(Continued)

OTHER PUBLICATIONS

International Preliminary Report on Patentability from corresponding PCT Application Serial No. PCT/US2017/026613 dated Jun. 26, 2018 (17 pp).

(Continued)

*Primary Examiner* — Christopher G Findley
(74) *Attorney, Agent, or Firm* — Shumaker & Sieffert, P.A.

(57) ABSTRACT

Methods and apparatus for coding video information having a plurality of video samples are disclosed. Blocks for video data are coded by an encoder based upon a quantization parameter (QP) for each block. The video data may be coded in a particular color space, such as YCoCg, wherein different QP values may be used for coding different color components of the video data. Because the human eye is generally more sensitive to differences in luma compared to chroma, and more sensitive to differences in chromatic green than chromatic orange, when the YCoCg color space is used to code the video data, different QP values may be determined for each color component channel. By coding each color component using different QP values, loss from quantization may be reduced while also reducing the appearance of visual artifacts in the coded video data.

25 Claims, 13 Drawing Sheets

(51) Int. Cl.
*H04N 19/152* (2014.01)
*H04N 19/176* (2014.01)
*H04N 19/186* (2014.01)
*H04N 19/184* (2014.01)

(52) U.S. Cl.
CPC ......... *H04N 19/176* (2014.11); *H04N 19/186* (2014.11); *H04N 19/184* (2014.11)

(56) References Cited

U.S. PATENT DOCUMENTS

| | | | | |
|---|---|---|---|---|
| 2013/0188693 | A1* | 7/2013 | Xu | H04N 19/70 375/240.03 |
| 2014/0247983 | A1* | 9/2014 | MacInnis | H04N 19/14 382/166 |
| 2015/0256840 | A1* | 9/2015 | Sato | H04N 19/124 375/240.03 |
| 2017/0214914 | A1* | 7/2017 | Sato | H04N 19/176 |

FOREIGN PATENT DOCUMENTS

| | | |
|---|---|---|
| WO | WO-2015160801 A2 | 10/2015 |
| WO | WO-2015196126 A1 | 12/2015 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Response to Written Opinion dated Jul. 5, 2017, from International Application No. PCT/US2017/026613, filed on Feb. 8, 2018, 17 pp.

Second Written Opinion dated Mar. 1, 2018, from International Application No. PCT/US2017/026613, 6 pp.

International Search Report and Written Opinion—PCT/US2017/026613—ISA/EPO—dated Jul. 5, 2017.

Xu J., et al., "Chroma QP Extension and Signalling Enhancement,"100. MPEG Meeting; Apr. 30, 2012-May 5, 2012; Geneva; (Motion Picture Expert Group or ISO/IEC JTC1/SC29/WG11), No. m24512, Apr. 28, 2012 (Apr. 28, 2012), XP030052855, pp. 1-11.

* cited by examiner

| i | LUT Co[i] | LUT Cg[i] | i | LUT Co[i] | LUT Cg[i] | i | LUT Co[i] | LUT Cg[i] |
|---|---|---|---|---|---|---|---|---|
| 0 | 24 | 24 | 20 | 50 | 45 | 40 | 72 | 66 |
| 1 | 25 | 25 | 21 | 51 | 46 | 41 | 72 | 67 |
| 2 | 26 | 26 | 22 | 52 | 47 | 42 | 72 | 68 |
| 3 | 27 | 27 | 23 | 53 | 48 | 43 | 72 | 69 |
| 4 | 29 | 28 | 24 | 55 | 49 | 44 | 72 | 70 |
| 5 | 30 | 29 | 25 | 56 | 50 | 45 | 72 | 71 |
| 6 | 31 | 30 | 26 | 57 | 51 | 46 | 72 | 72 |
| 7 | 33 | 31 | 27 | 59 | 52 | 47 | 72 | 72 |
| 8 | 34 | 32 | 28 | 60 | 53 | 48 | 72 | 72 |
| 9 | 35 | 33 | 29 | 61 | 54 | 49 | 72 | 72 |
| 10 | 37 | 34 | 30 | 63 | 55 | 50 | 72 | 72 |
| 11 | 38 | 35 | 31 | 64 | 56 | 51 | 72 | 72 |
| 12 | 39 | 36 | 32 | 65 | 57 | 52 | 72 | 72 |
| 13 | 40 | 37 | 33 | 66 | 58 | 53 | 72 | 72 |
| 14 | 42 | 38 | 34 | 68 | 59 | 54 | 72 | 72 |
| 15 | 43 | 39 | 35 | 69 | 60 | 55 | 72 | 72 |
| 16 | 44 | 40 | 36 | 70 | 61 | 56 | 72 | 72 |
| 17 | 46 | 41 | 37 | 72 | 62 | | | |
| 18 | 47 | 42 | 38 | 72 | 63 | | | |
| 19 | 48 | 43 | 39 | 72 | 64 | | | |

FIG. 7

APPARATUS AND METHODS FOR PERCEPTUAL QUANTIZATION PARAMETER (QP) WEIGHTING FOR DISPLAY STREAM COMPRESSION

CROSS-REFERENCE TO RELATED APPLICATIONS

This application claims the benefit of U.S. Provisional Application No. 62/322,730, filed Apr. 14, 2016, which is hereby incorporated by reference under 37 CFR 1.57.

TECHNICAL FIELD

This disclosure relates to the field of video coding and compression, and particularly, to compression of video for transmission over display links.

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

SUMMARY

The systems, methods and devices of this disclosure each have several innovative aspects, no single one of which is solely responsible for the desirable attributes disclosed herein.

In one embodiment, an apparatus and method are provided for improving visual quality in display stream compression of video information. The method comprises defining a chrominance orange (Co) step size for quantizing a Co channel of the video information. The method further comprises defining a chrominance green (Cg) step size for quantizing a Cg channel of the video information. The Co step size is higher than the Cg step size. The method further comprises mapping luma quantization parameters (QP) to either the Co channel or Cg channel in a first look-up table for Co QP and a second look-up table for Cg QP based on the Co step size and Cg step size.

In some embodiments, an apparatus for coding video data using display stream compression is provided. The apparatus comprises an encoder configured to code a current block of video data using the YCoCg color space comprising a luma channel, a chrominance orange (Co) channel, and a chrominance green (Cg) channel. The apparatus further comprises a rate controller comprising a hardware processor. The rate controller is configured to determine a luma quantization parameter (QP) for quantizing the luma channel of the current block of video data. The rate controller is further configured to, based upon the determined luma QP, determine a Cg QP for quantizing the Cg channel of the current block of video data and a chrominance orange Co QP for quantizing the Co channel of the current block of video data. The Cg QP and the Co QP determined by the rate controller are greater than the luma QP and are different from each other. The encoder is configured to encode the current block of video data based upon the determined luma QP, Co QP, and Cg QP to form a video data bitstream for display or transmission.

In some embodiments, a method for coding video data using display stream compression is provided. The method comprises receiving a current block of video data to be coded using the YCoCg color space comprising a luma channel, a chrominance orange (Co) channel, and a chrominance green (Cg) channel. The method further comprises determining a luma quantization parameter (QP) for quantizing the luma channel of the current block of video data. The method further comprises, based upon the determined luma QP, determining a Cg QP for quantizing the Cg channel of the current block of video data and a chrominance orange Co QP for quantizing the Co channel of the current block of video data, wherein the Cg QP and the Co QP are greater than the luma QP and are different from each other. The method further comprises encoding the current block of video data based upon the determined luma QP, Co QP, and Cg QP to form a video data bitstream for display or transmission.

In some embodiments, an apparatus for coding video data using display stream compression is provided. The apparatus comprises means for receiving a current block of video data to be coded using the YCoCg color space comprising a luma channel, a chrominance orange (Co) channel, and a chrominance green (Cg) channel. The apparatus further comprises means for determining a luma quantization parameter (QP) for quantizing the luma channel of the current block of video data. The apparatus further comprises means for based upon the determined luma QP, determining a Cg QP for quantizing the Cg channel of the current block of video data and a chrominance orange Co QP for quantizing the Co channel of the current block of video data, wherein the Cg QP and the Co QP are greater than the luma QP and are different from each other. The apparatus further comprises means for encoding the current block of video data based upon the determined luma QP, Co QP, and Cg QP to form a video data bitstream for display or transmission.

BRIEF DESCRIPTION OF THE DRAWINGS

FIG. 7 shows a table illustrating an exemplary mapping of luma QP values to Co and Cg QP values, in accordance with some embodiments.

DETAILED DESCRIPTION

Figure 1A:
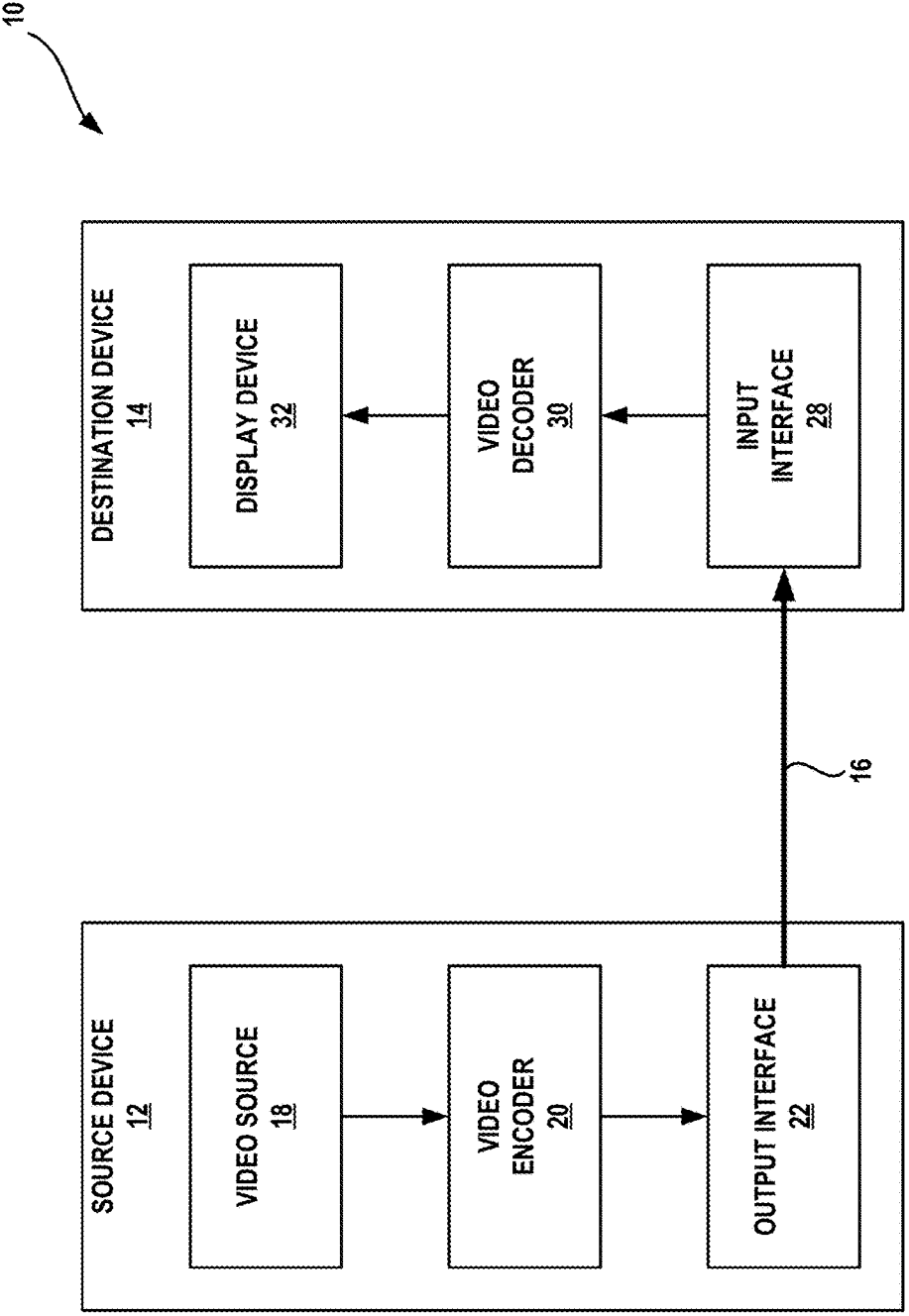
FIG. 1A is a block diagram illustrating an exemplary video encoding and decoding system that may utilize techniques in accordance with aspects described in this disclosure.

In general, this disclosure relates to methods of improving video compression techniques such as those techniques used to compress display streams. More specifically, the present disclosure relates to systems and methods for improving the updating of a quantization parameter (QP) via the selection of an appropriate technique for calculating a QP adjustment value.

While certain embodiments are described herein in the context of the Display Stream Compression (DSC) standard, systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

A generation of 3:1 display stream compression (DSC) v1.0 solution recently finalized by the Video Electronics Standards Association (VESA) is insufficient to drive future mobile market requirements, especially for high resolution displays such as 4K. Therefore, to cope with future demands, VESA released CfT (call for technology) in order to develop a next generation DSC solution that targets compression ratios of 4:1 and higher.

Generally, a DSC coder provides low cost, fixed rate visually lossless compression. The coder is designed based on a block-based approach (with block size P×Q) and is comprised of a multitude of coding modes. For example, available coding options for each block are a transform (e.g., DCT, Hadamard), block prediction, DPCM, pattern, mid-point prediction (MPP) and mid-point predication fall back (MPPF) mode. Several coding modes are used in the coder in order to effectively compress different types of contents or images. For example, the text images can be effectively compressed by the pattern mode, while the natural image can be effectively captured by the transform mode.

Each block can choose one coding mode from the plurality of coding modes based on rate-control mechanism which aims to select the best mode for each block by considering both the rate and the distortion of the mode. The rate-control mechanism is supported by a buffer model, and it is the design requirement of the codec that the buffer is never in a state of underflow (fewer than zero bits in the buffer) or overflow (buffer size has increased past a set maximum size).

Video coding methods may calculate a QP value by updating a previously calculated QP value with a QP adjustment value. The QP adjustment value may be calculated based on a difference between a previous block and a current block, e.g., a difference between the bits required to code the previous block and the target number of bits in which to code the current block.

However, the QP adjustment value which is determined by conventional techniques may result in coding inefficiencies or may cause noticeable artifacts under certain circumstances. For example, conventional techniques for determining the QP adjustment value may not be aggressive enough for transitions from flat to complex regions of an image (e.g., the QP adjustment value may be smaller than a more desirable QP adjustment value which would result in better coding efficiency without noticeable artifacts). The concepts of flat and complex regions will be described in greater detail below.

Additionally, when the fullness of the buffer is within a threshold value of being empty or full, the conventional techniques for calculating the QP adjustment value may be too aggressive, resulting in artifacts in an image reconstructed by a decoder. For example, a QP adjustment value calculated by the conventional techniques may be larger than a more desirable QP adjustment value which would mask artifacts from being noticeable in the reconstructed image.

Accordingly, aspects of this disclosure are directed to solving at least the above-indicated problems. In certain aspects, this may be accomplished via the detection or determination of conditions which may be associated with the above-indicated problems, and applying one or more alternative techniques for calculating a QP adjustment value under the detected conditions.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A shows a block diagram that illustrates an exemplary video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
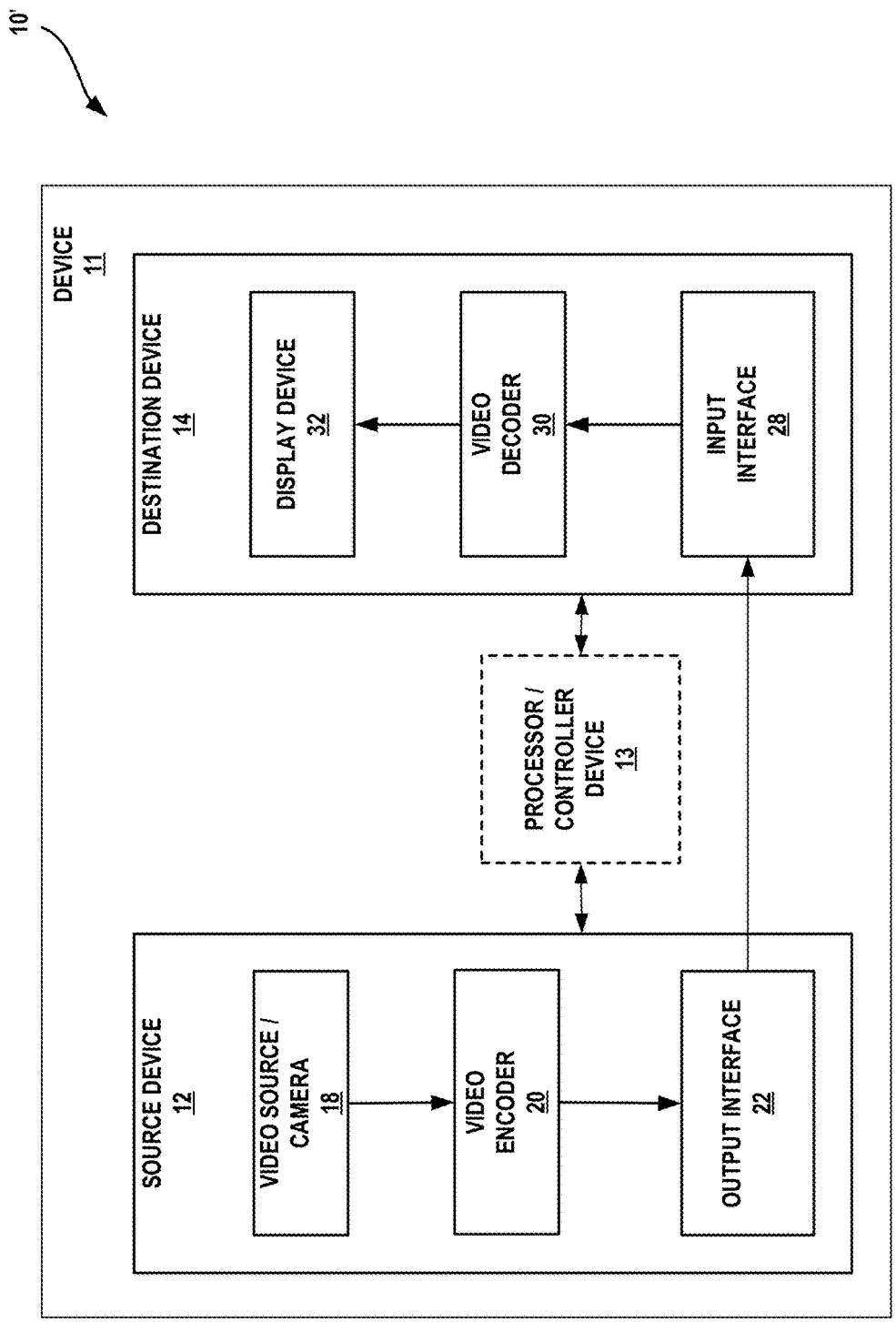
FIG. 1B shows a block diagram illustrating another exemplary video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an exemplary video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a QP. To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
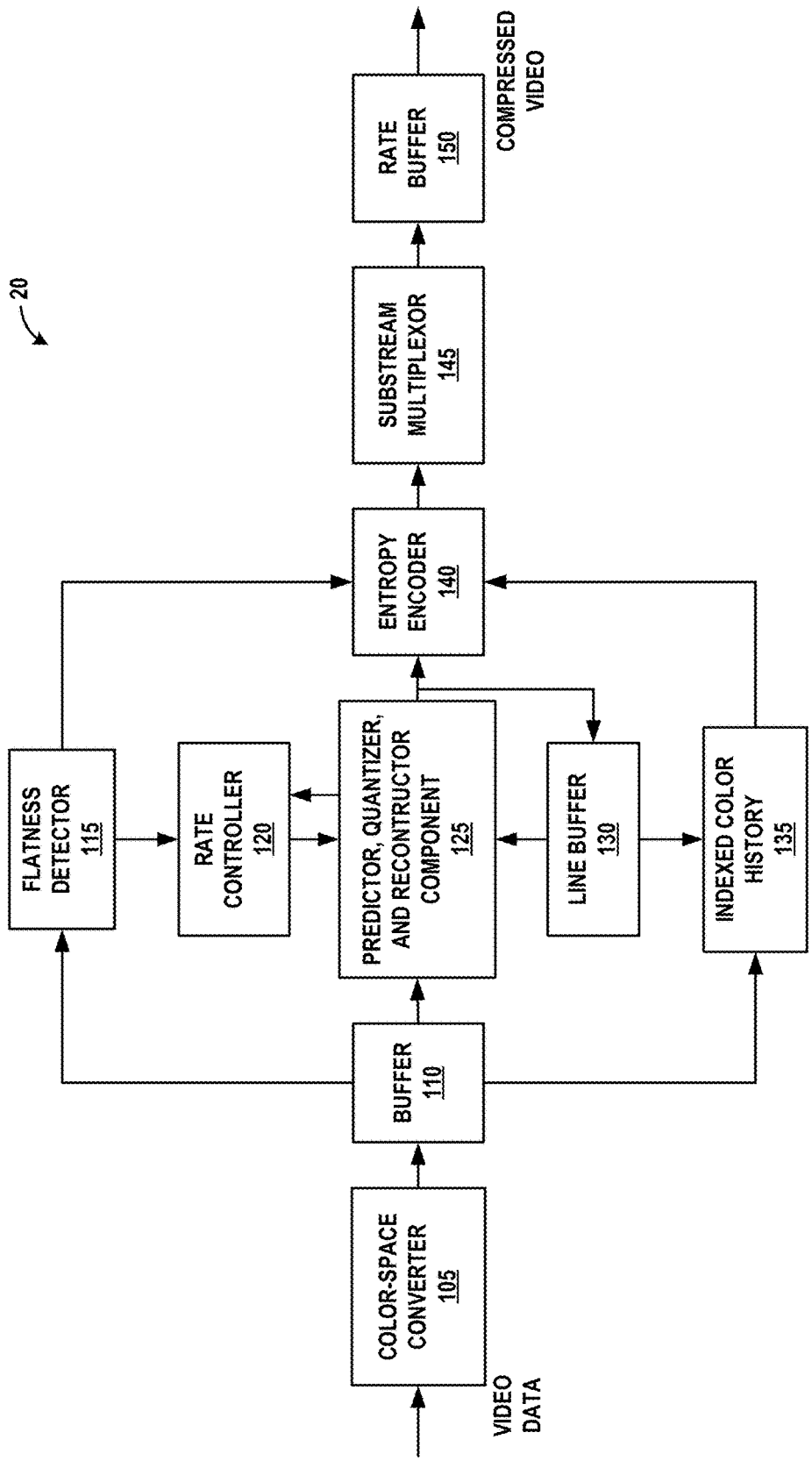
FIG. 2A shows a block diagram illustrating an example of a video encoder that may implement techniques in accordance with aspects described in this disclosure.

FIG. 2A shows a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to the buffer 110's use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a CBR buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

$$BF=((BufferCurrentSize*100)/BufferMaxSize)$$

It is noted that the above approach to calculating BF is merely exemplary, and that the BF may be calculated in any number of different ways, depending on the particular implementation or context.

The flatness detector 115 can detect changes from complex (i.e., non-flat) areas in the video data to flat (i.e., simple or uniform) areas in the video data, and/or vice versa. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions from complex to flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. Similarly, transitions from flat to complex regions may be used by the video encoder 20 to increase the QP in order to reduce the expected rate required to code a current block.

The rate controller 120 determines a set of coding parameters, e.g., a QP. The QP may be adjusted by the rate controller 120 based on the buffer fullness of the rate buffer 150 and image activity of the video data (e.g., a transition from complex to flat regions or vice versa) in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate. Thus, one purpose of the rate controller 120 is to determine a set of coding parameters, such as QP(s), coding mode(s), etc., to satisfy instantaneous and average constraints on rate while maximizing rate-distortion performance.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
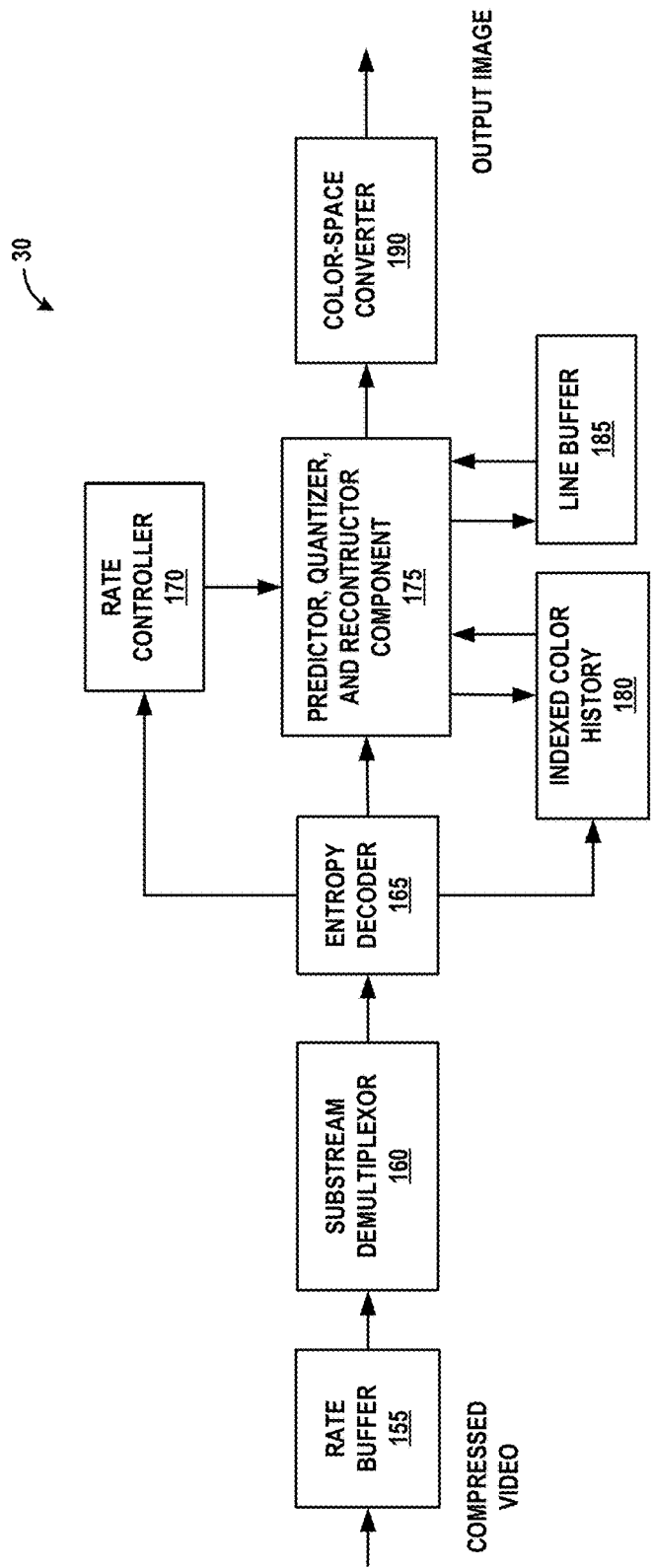
FIG. 2B shows a block diagram illustrating an example of a video decoder that may implement techniques in accordance with aspects described in this disclosure.

FIG. 2B shows a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Video Codecs

In some embodiments, the encoder 20 may code video data using a codec having many elements (modes) aimed at encoding various types of content with visually lossless performance. In some embodiments, the encoder 20 may code the video data using DSC algorithms, such as Advanced Display Stream Compression (ADSC) algorithms. In some embodiments, the DSC algorithms used by the encoder 20 may be configured to reduce an amount of error in the S-CIELAB delta-E color metric (a spatial extension of the CIELAB color difference metric) of the coded video data when reconstructed by the decoder 30. In other embodiments, the DSC algorithm used by the encoder 20 may be tuned to focus on maximizing peak signal-to-noise ratio (PSNR) of the reconstructed video data.

In some embodiments, the DSC codec used by the encoder 20 may be block-based and comprises a multitude of coding modes, each aimed at compressing different types of video content. Mode selection may be handled by a rate-control mechanism (in software or hardware), such as the rate controller 120, which aims to select the best mode for each block by considering both the rate and the distortion of the mode. The rate-control mechanism may be supported by a hypothetical reference decoder (HRD) buffer model (e.g., the rate buffer 150). The rate controller 120 may select a codec configured to support the buffer 150 to avoid a state of underflow (fewer than zero bits in the buffer) or overflow (buffer size has increased past a set maximum size).

In some embodiments, error between input video data and video data coded by the encoder 20 may be measured using an S-CIELAB algorithm. The S-CIELAB algorithm is an extension to the CIELAB color metric, which gives an error metric (delta-E) for color differences in digital images. S-CIELAB is a spatial extension of the CIELAB color metric, incorporating spatial sensitivities of the human visual system. As such, the S-CIELAB algorithm may be able to more accurately predict perceived color differences in reconstructed images by the decoder 30, in comparison with CIELAB, due to the spatial filtering step. Because the S-CIELAB metric correlates well with perceived color differences, S-CIELAB may be used to analyze subjective performance of DSC codecs. In particular, areas of images reconstructed from coded video data having high S-CIELAB delta-E values are more likely to be noticed by human observers. Therefore, in order to improve the performance of coded video data, the encoder 20 may be configured to code video data such that an amount of S-CIELAB delta-E in reconstructed images of the coded video data is reduced.

As discussed above, color errors in reconstructed images decoded by the decoder 30 from video data coded by the encoder 20 may result due to quantization losses during the encoding process. The encoder 20 may control an amount of quantization loss by determining a QP value for each block of video data to be coded. In some embodiments, quantization losses in certain color components may be more easily noticed by human observers. For example, in some embodiments, for video data coded using the YCoCg color space, quantization losses in the luma Y component may be more easily observed by a human observer in comparison with quantization losses in the chroma Co and Cg components.

Determining QP Values

Figure 3:
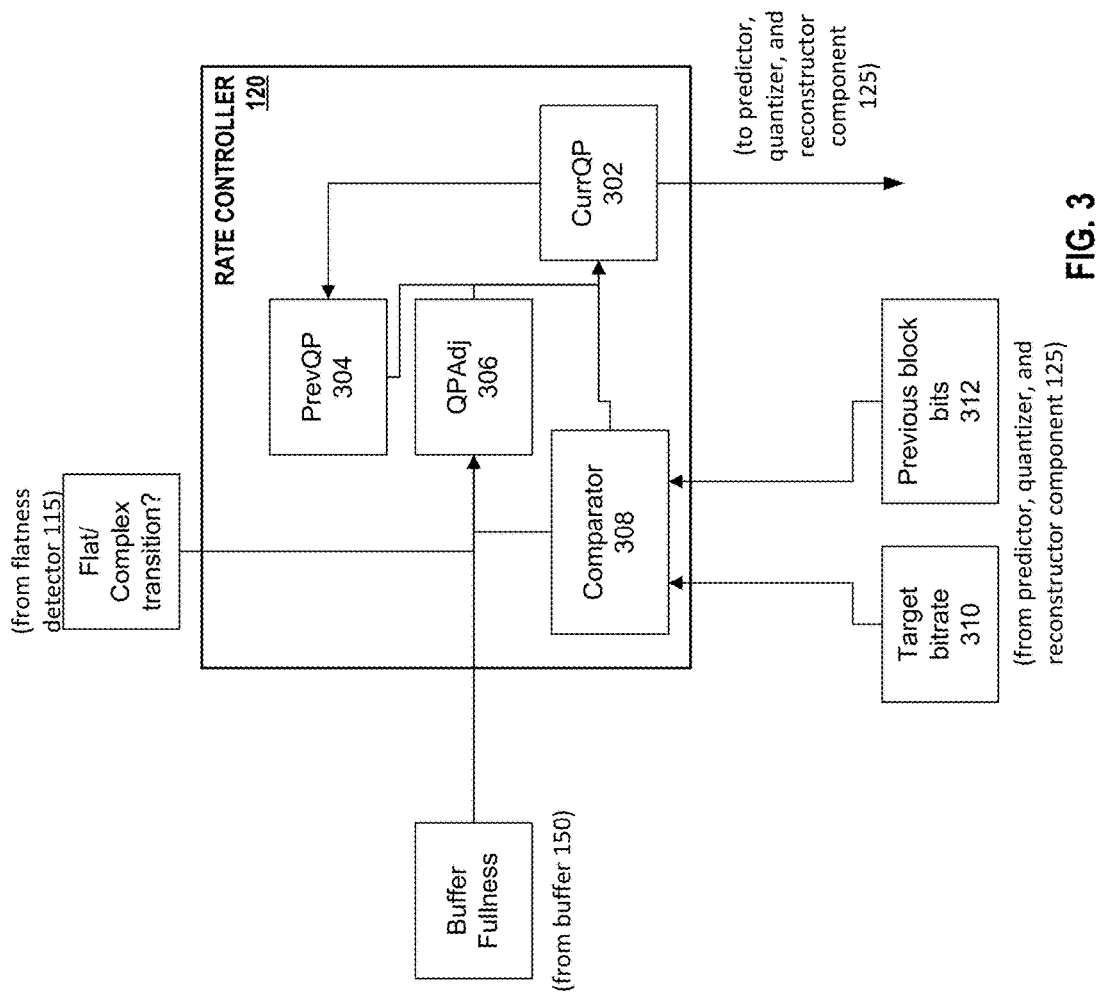
FIG. 3 shows a block diagram illustrating an exemplary rate controller configured to determine a QP value for a current block of video data.

FIG. 3 shows a block diagram illustrating an exemplary rate controller 120 configured to determine a QP value for a current block of video data. In some embodiments, the rate controller 120 may calculate a currQP 302 corresponding to the QP value for coding a current block of video data based upon a prevQP 304 corresponding to the QP value used for a previously coded block of video data and a QP adjustment value QpAdj 306. For example, in some embodiments, the rate controller 120 may increment or decrement the QP adjustment value QpAdj 306 from prevQp 304 to determine the currQP 302, based upon a comparison (e.g., using a comparator 308) between a target bitrate 310 and a number of bits 312 that were used to code the previous block (hereinafter referred to as previous block bits 312). As used herein, the target bitrate 310 may indicate a target number of bits for coding the current block of video data. In some embodiments, if the comparator 308 determines that that the previous block bits 312 is greater than the target bitrate 310, the rate controller 120 may decrement prevQp 304 by QpAdj 306. On the other hand, if the comparator 308 determines that the previous block bits 312 is less than the target bitrate 310, the rate controller 120 may increment prevQp 304 by QpAdj 306.

In some embodiments, QpAdj 306 may correspond to a predetermined value. In some embodiments, the value of QpAdj 306 may be determined based upon a difference between the target bitrate 310 and previous block bits 312. For example, in some embodiments, if the comparator 308 determines that the difference between the target bitrate 310 and previous block bits 312 exceeds a first threshold value, the rate controller 120 may determine a value for QpAdj 306 that is higher than if the comparator 308 determines that the difference between the target bitrate 310 and previous block bits 312 does not exceed the first threshold value.

In some embodiments, the rate controller 120 may determine the value of QpAdj 306 based upon a measure of buffer fullness of the buffer 150. The buffer fullness of the buffer 150 may be expressed as a ratio of an amount of data currently stored in the buffer 150 (e.g., a number of bits) and a total current capacity of the buffer 150. For example, in some embodiments, if the buffer fullness of the buffer 150 is high (e.g., the buffer 150 is close to full), the rate controller 120 may set the value of QpAdj 306 such that the currQP 302 will be higher (such that the encoder 20 will encode the current block of video data using a lower number of bits). On the other hand, if the buffer fullness of the buffer 150 is low (e.g., the buffer 150 is nearly empty), the rate controller 120 may set the value of QpAdj 306 such that the currQP 302 will have a lower value (such that the encoder 20 will encode the current block using a higher number of bits).

In some embodiments, the rate controller 120 may determine the value of QpAdj 306 based upon a determination by the flatness detector 115 of whether the current block of video data contains a transition between a flat region to a complex region. For example, in some embodiments, if the flatness detector 115 determines that the current block of video data contains a flat region, or a transition from a complex region to a flat region, the rate controller 120 may set the currQP 302 to a predetermined value.

The determined currQP 302 may be used by the predictor, quantizer, and reconstructor component 125 of the encoder 20 to code the current block of video data. The rate controller 120 may also use the determined currQP 302 as the prevQp 304 for determining a currQP 302 for a subsequent block of video data.

Separate Luma and Chroma QP Values

In some embodiments, the DSC codec used by the encoder 20 may make use of the YCoCg color space for certain modes. The Y component of the YCoCg color space may be referred to as the luma or luminance component, while the Co and Cg components may be referred to as chroma or chrominance components. The Co component may be referred to as chrominance orange, while the Cg component may be referred to as chrominance green.

In some embodiments, the encoder 20 may encode the luma components of received video data as part of a luma channel, and chroma components as part of a chroma channel. The encoder 20, when coding the current block of video data, may quantize the luma channel components and chroma channel components of the video data differently (e.g., such that the luma channel and chroma channel are associated with different QP values). For example, the encoder 20 may assign values to the luma channel components and chroma channel components of the video data using different quantization step sizes (e.g., increments between adjacent coded values).

In some embodiments, the encoder 20 may code luma and chroma components differently using different QP values because luminance is generally more important than chrominance to the human visual system. For example, the human eye may be more sensitive to details in the luma component than in the chroma component, and thus may be able to more easily detect errors in the luma component than in the chroma component.

Therefore the encoder 20 may quantize the chroma components (Co/Cg) more aggressively (e.g., using higher QP values) than the luma component (Y). By using a higher QP value from coding chroma components in comparison the luma components, the encoder 20 may code the chroma components using a higher quantization step size, and the luma components using a lower quantization step size. By using a lower quantization step size when coding the luma components of the video data, an amount of loss from coding the luma components may be reduced, potentially reducing detectable errors in the coded video data. On the other hand, by coding the chroma components using a higher quantization step size, the encoder 20 may be able to code the chroma components of the video data using fewer bits, allowing for more bits to be used in the coding of the luma components.

As such, for a given block of video data, the encoder 20 may code the chroma component using a higher QP value in comparison with the luma component. As used herein, the QP value associated with the luma components of a block of video data is generally referred to as the luma QP or luma channel QP, while the QP value associated with the chroma components of a block of video data is generally referred to as the chroma QP or chroma channel QP.

Figure 4:
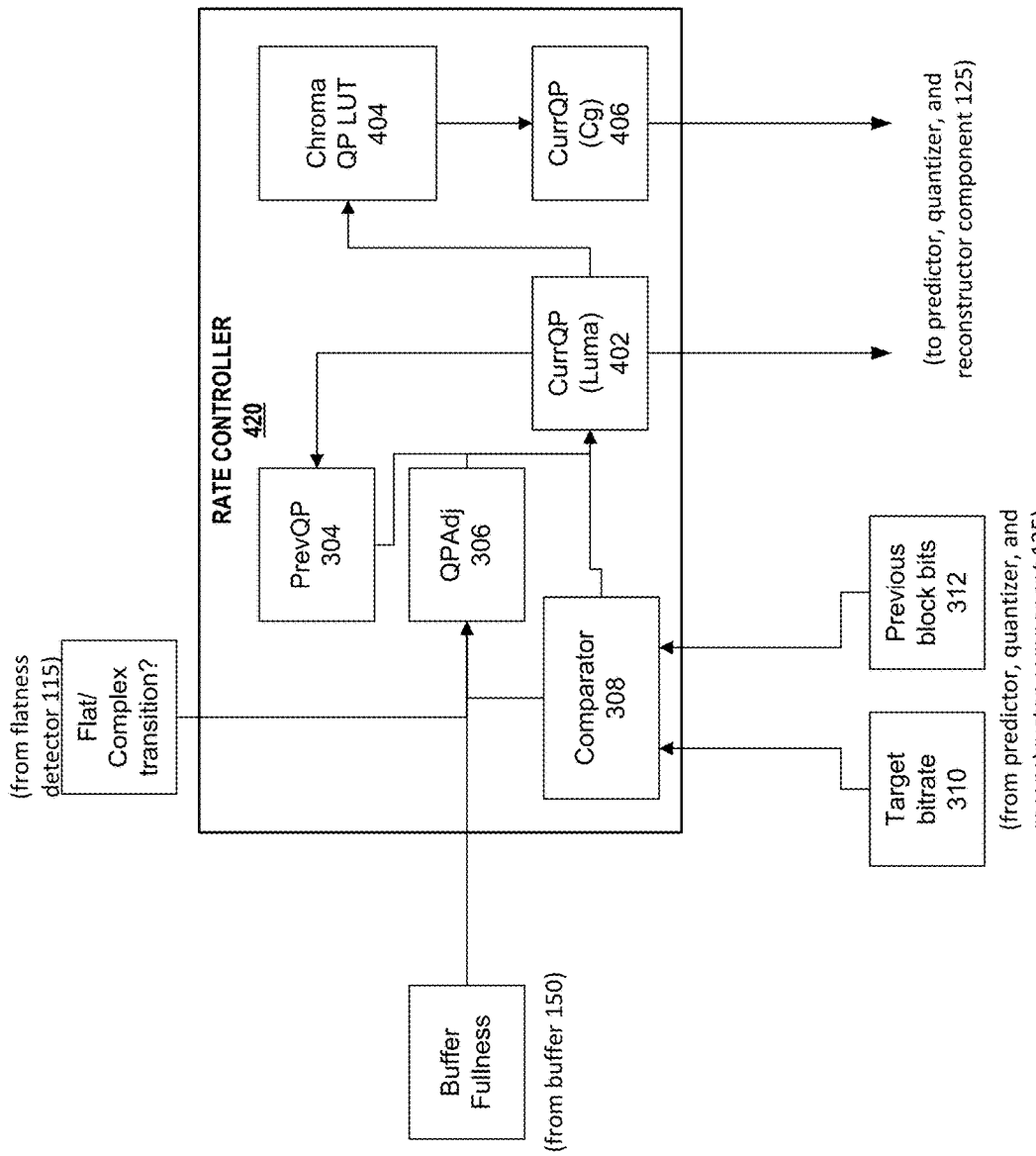
FIG. 4 shows a block diagram illustrating an exemplary rate controller configured to determine separate luma and chroma QP values for a block of video data.

FIG. 4 shows a block diagram illustrating an exemplary rate controller 420 configured to determine separate luma and chroma QP values for a block of video data. The rate controller 420 may be similar to the rate controller 120 of FIG. 3. Unlike the rate controller 120 of FIG. 3, the rate controller 420, instead of calculating a single currQP value 302 for the current block of video data, may instead calculate a luma QP 402 for the current block that is specific to the luma channel. In some embodiments, the rate controller 420 may calculate the luma QP 402 using the same techniques used by the rate controller 120 for calculating the currQP value 302.

In addition, the rate controller 420 may store or have access to a look-up-table (LUT) or other data structure 404 (hereinafter referred to as LUT 404) which may be used to calculate or infer a chroma QP 406 for the current block of video data from the calculated luma QP 402. The LUT 404 may be constructed using a predetermined relationship between the luma and chroma QP 402 and 406. In some embodiments, the LUT 404 is configured such that for a given luma QP 402, the chroma QP 406 will be greater than or equal to the luma QP 402. In some embodiments, the derived value for chroma QP 406 may be used by the encoder 20 to quantize both Co and Cg chroma components when coding the block of video data. Although FIG. 4 illustrates the LUT 404 as being stored within the rate controller 120, it is understood that it some embodiments, the LUT 404 may be stored in a memory external from the rate controller 120 but is accessible by the rate controller 120.

Figure 5:
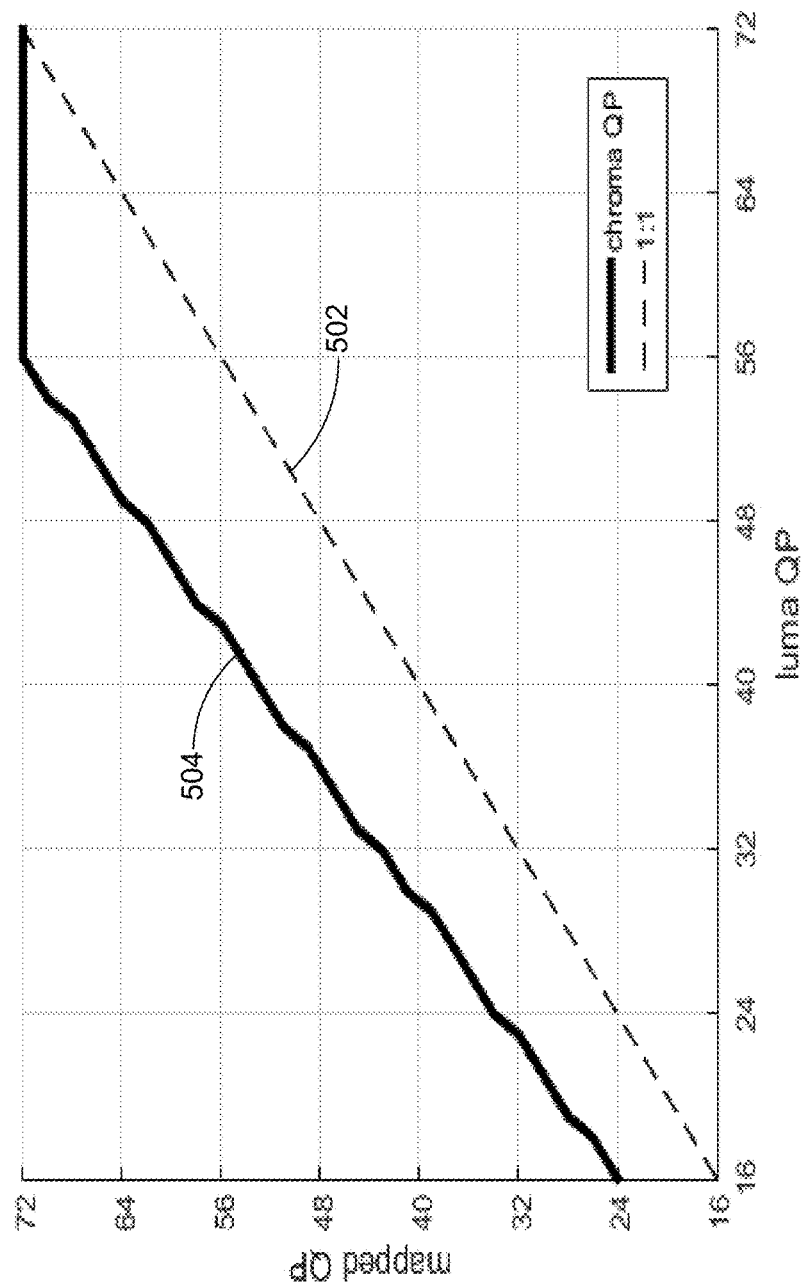
FIG. 5 shows a graph illustrating an exemplary relationship between chroma QP and luma QP, in accordance with some embodiments.

FIG. 5 shows a graph illustrating an exemplary relationship between chroma QP and luma QP, in accordance with some embodiments. The graph of FIG. 5 shows an x-axis corresponding to luma QP values ranging between 16 and 72, and a y-axis corresponding to chroma QP values ranging between 16 and 72. The graph illustrates a first curve 502 (shown as a dashed line) indicating a 1:1 relationship between chroma QP and luma QP (e.g., if luma and chroma QP are the same). In addition, the graph of FIG. 5 illustrates a second curve 504 (shown as a solid line) indicating an exemplary scheme that may be used by the rate controller 320 to map luma QP to chroma QP values.

As shown in FIG. 5, the rate controller 320 may set the chroma QP to be greater than or equal to the corresponding luma QP. For example, when luma QP is at a minimum value of 16, the mapped chroma QP value may be 24. When the luma QP is at 56, the mapped chroma QP may be at a maximum value of 72. In some embodiments, when the chroma QP value has reached a maximum value (e.g., 72), the chroma QP may be mapped to the maximum value for further increasing luma QP values, such that for luma QP values above 56, the chroma QP will stay at the maximum value of 72. In some embodiments, the luma QP to chroma QP mapping scheme illustrated in the second curve 504 may correspond to the mapping scheme of the LUT 404 of the rate controller 420 illustrated in FIG. 4.

Separate Co and Cg QP Values

As noted above, S-CIELAB delta-E may be used as a metric as to a level of error in a reconstructed image that may be detected by the human eye. In some embodiments, the S-CIELAB delta-E metric may factor in parameters such as viewing distance and a model of the human visual system (HVS) (e.g., as part of the spatial extension of the metric). As such, S-CIELAB delta-E may be used to predict in which spatial regions of a reconstructed image a human observer may notice distortion (for example during motion or flicker testing). By configuring the DSC codec used by the encoder 20 to minimize delta-E, the encoder 20 may be able to code video data wherein the amount of artifacts observable during visual testing may be reduced.

Figure 6:
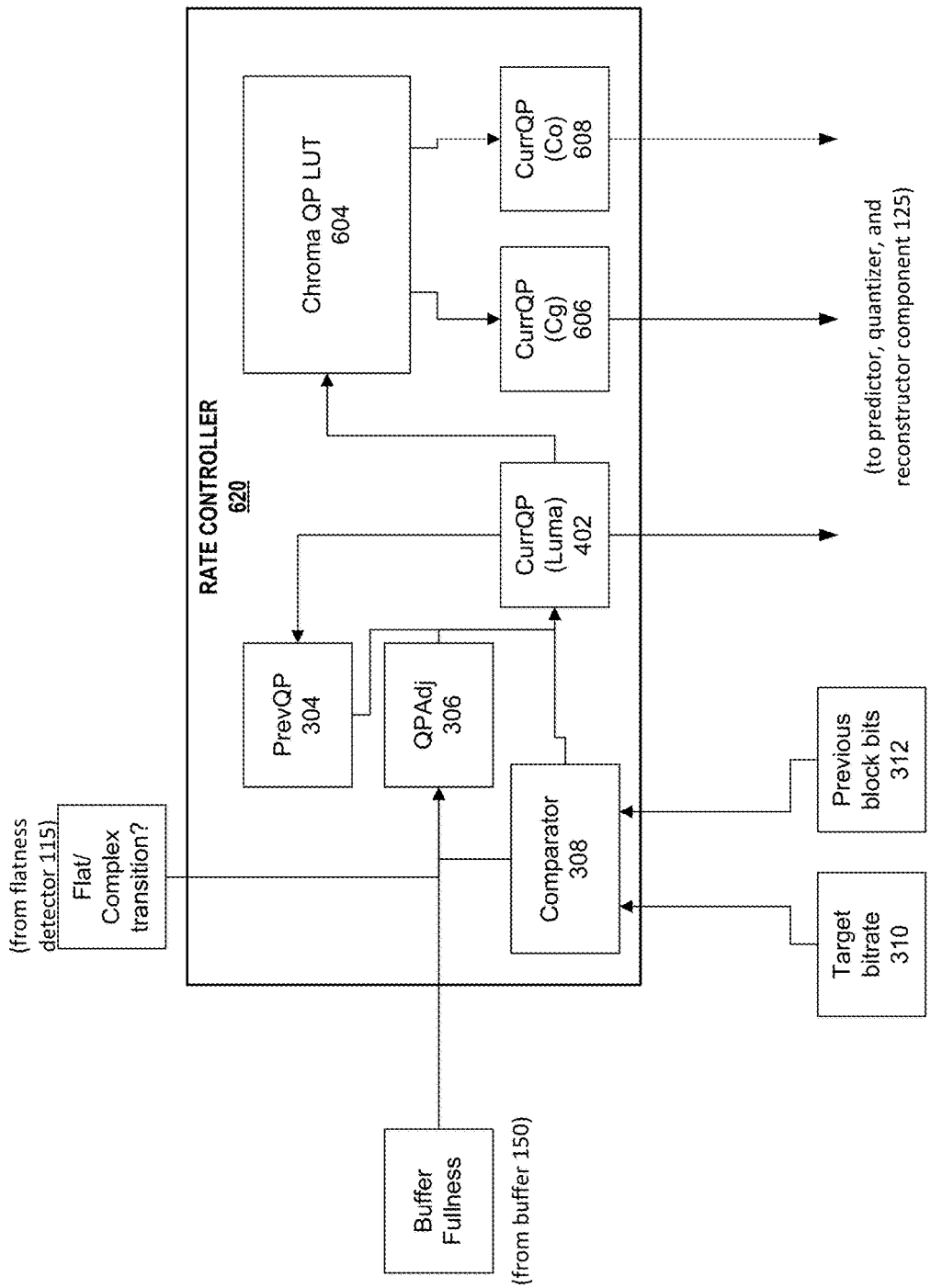
FIG. 6 shows a block diagram illustrating an exemplary rate controller configured to determine separate luma and chroma QP values for a block of video data.

FIG. 6 shows a block diagram illustrating an exemplary rate controller 620 configured to determine separate luma and chroma QP values for a block of video data. The rate controller 620 may be similar to the rate controller 120 of FIG. 3 and the rate controller 420 of FIG. 4. Similar to the rate controller 420, the rate controller 620, instead of calculating a single QP value of the block of video data, may instead calculate a luma QP 402 for the block of video data.

In addition, the rate controller 620 may comprise an LUT or other data structure 604 that maps luma QP values 402 to separate Cg and Co QP values 606 and 608. In some embodiments, the Cg and Co QP values 606 and 608 will be greater than or equal to corresponding luma QP values 402. In addition, for a given luma QP value 402, the corresponding Co QP value 608 will be greater than or equal to the corresponding Cg QP value 606.

As discussed above, quantization losses in certain color components may be more easily noticed by human observers. For example, a human observer may be able to more easily detect quantization losses in the luma Y color component in comparison to the chroma Co and Cg color components. As such, in some embodiments, the rate controller 420 may determine separate QP values for the luma and chroma channels, wherein the chroma color channel may be quantized more aggressively than the luma color channel.

In addition, in some embodiments, human observers may be able to more easily detect quantization losses in the chroma Cg component in comparison to the chroma Co color component. As such, the rate controller 620 may determine separate QP values for the luma Y color component, the chroma Co color component, and the chroma Cg color component. The rate controller 620 may quantize the Co color component more aggressively than the Cg color component, such that the for a given luma QP value, the corresponding Co chroma QP value may be greater than or equal to the corresponding Cg chroma QP value. This may allow for the encoder 20 to use fewer bits and a larger quantization step size when coding the chroma Co components of the video data, and more bits and a smaller quantization step size when coding the chroma Cg components of the video data, potentially reducing an amount of error due to loss when coding the Cg components of the video data. By reducing an amount of error due to loss when coding the luma and Cg components of the video data, a total amount of detectable error in the coded video data may be reduced.

Although FIG. 6 illustrates a single LUT 604 for mapping luma QP values 402 to Co and Cg QP values 606 and 608, it is understood that in other embodiments other types of data structures may be used. For example, in some embodiments, the rate controller 620 may access two LUTs (e.g., a first LUT mapping luma QP values 402 to Co QP values 608, and a second LUT mapping luma QP values to Cg QP values 606). In some embodiments, columns of the LUT 604 or two separate LUTs corresponding to Co and Cg components may be referred to as $LUT_{Co}$ and $LUT_{Cg}$.

In some embodiments, given a luma QP value 402 ($QP_Y$), the QPs for Co and Cg 606 and 608 may be derived as:

$$QP_{Co} = LUT_{Co}[QP_Y - MinQP]$$

$$QP_{Cg} = LUT_{Cg}[QP_Y - MinQP]$$

where MinQP represents a minimum QP used by the codec used for coding the video data (e.g., the QP which corresponds to a quantization step size of 1). For example, in some DSC codecs (e.g., the ADSC codec), MinQP=16.

In some embodiments, the predictor, quantizer, and reconstructor component 125 of the encoder 20 may map different QP values to different quantization step sizes. For example, in a particular ADSC codec, QP values of 16, 24, 32, 40, 48, 56, and 64 may correspond to quantization step sizes of 1, 2, 4, 8, 16, 32, and 64 respectively. In some embodiments, the encoder 20 may store a quantization step size for each QP. In other embodiments, the encoder 20 may specify a scaling matrix or other data structure from which quantization step size may be derived from QP. In some embodiments, the quantization step size may be a power of two, while in other embodiments, the quantization step size may also be a non-power of two.

In some embodiments, the rate controller 620 may further adjust the determined QP values 402, 606, 608 based upon a compressed bitrate of the video data to be coded. For example, in some embodiments, the video data may have a default compressed bitrate of 8 bpc (bits per component). For video data at the default 8 bpc level, the determined QP values as calculated above may be unadjusted. However, for video data having a compressed bitrate above 8 bpc, the rate controller 620 may adjust the determined QP values as follows:

$$QP=QP+((bpc-8)<<3)$$

FIG. 7 shows a table illustrating an exemplary mapping of luma QP values 402 to Co and Cg QP values 608 and 606, in accordance with some embodiments. The mapping of luma QP values 402 to Co and Cg QP values 608 and 606 illustrated in FIG. 7 may correspond to the mapping stored in the LUT 604 illustrated in FIG. 6. FIG. 7 illustrates a table having a first column 702 corresponding to values of luma QP 402 subtracted by minQP ($QP_Y$–MinQP) from a minimum value of 0 to a maximum value of 56. In addition, the table has a second column 704 corresponding to mapped Co QP values 608 and a third column 706 corresponding to mapped Cg QP values 606. For example, when the luma QP 402 is at a minimum value of 16, the Co and Cg QP values 608 and 606 may both have a value of 24. However, as the luma QP 402 increases, the Co Qp value 608 may increase faster than the Cg QP value 606.

As an example, if the rate controller 620 assigns a QP of 40 to the luma channel, then the following QPs may be used for the chroma components, based upon the mapping scheme illustrated in FIG. 7:

$$QP_{Co}=LUT_{Co}[40-16]=55$$

$$QP_{Cg}=LUT_{Cg}[40-16]=49$$

Figure 8:
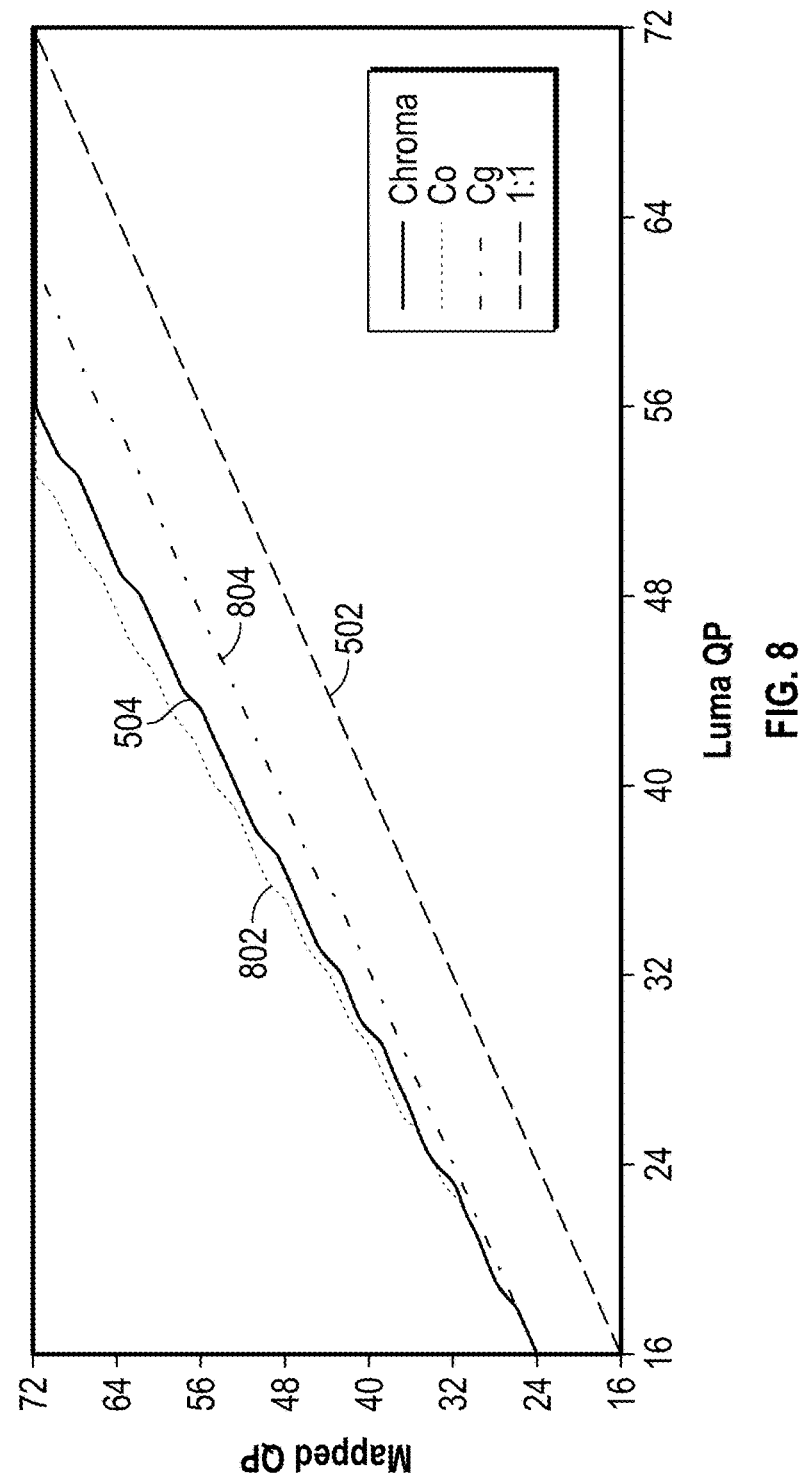
FIG. 8 shows a graph illustrating exemplary relationships between luma QP and mapped Co QP and Cg QP values, in accordance with some embodiments.

FIG. 8 shows a graph illustrating exemplary relationships between luma QP and mapped Co QP and Cg QP values, in accordance with some embodiments. Similar to FIG. 5, the graph of FIG. 8 shows an x-axis corresponding to luma QP values ranging between 16 and 72, and a y-axis corresponding to chromo QP values ranging between 16 and 72. The graph illustrates a first curve 502 indicating a 1:1 relationship between chroma QP and luma QP, and a second curve 504 appearing higher than the first curve 502 indicating the mapping scheme luma QP to chroma QP values illustrated in FIG. 5. The graph further comprises a third curve 802 indicating mapped Co QP values corresponding to different luma QP values, and a fourth curve 804 indicating mapped Cg QP values corresponding to different luma QP values. As illustrated in FIG. 8, the third curve 802 corresponding to Co QP values may be generally higher than the second curve 504, while the fourth curve 804 corresponding to Cg QP values may be generally lower than the second curve 504. Both the third curve 802 and fourth curve 804 may be generally higher than the first curve 502, indicating that for a given luma QP value, the corresponding values for Co QP and Cg QP will generally be higher than the luma QP value.

The third and fourth curves 802 and 804 correspond to the mapped Co QP and Cg QP values of columns 704 and 706 of FIG. 7, respectively. As illustrated in FIG. 8, for a given luma QP, the values for Co QP and Cg QP will tend be greater than or equal to the luma QP. In addition, Co QP will tend to be greater than or equal to Cg QP. The Co QP values, illustrated on the third curve 802, may be greater than or equal to the corresponding chroma QP values 504 as determined using the mapping scheme illustrated in FIG. 5. On the other hand, the Cg QP values, illustrated by the fourth curve 804, may be less than or equal to the corresponding chroma QP values 504.

As discussed above, the rate controller 620 may scale Co QP values 608 more aggressively in comparison to Cg QP values 608. For example, Co QP values 608 may be quantized using higher QP values compared to Cg QP values 606 (e.g., resulting in the predictor, quantizer, and reconstructor component 125 quantizing the values using a larger quantization step size). More particularly, while quantizing color components Co and Cg in a block, the rate controller 620 may, instead of setting the same quantization step sizes for both Co and Cg components, use a higher step size for Co channel when compared to the step size of Cg channel. This may be due to the fact that human eyes are typically less sensitive to differences in the Co color channel compared to the Cg color channel. As such, artifacts in the Co color channel may be less likely to be noticed compared to the Cg color channel. In addition, in some embodiments for typical worst-case image content, there may be more energy in the Co channel relative to the Cg channel. Therefore the rate controller 620 can quantize Cg less aggressively (e.g., using a smaller QP value) without significantly increasing the expected bitrate, due to being able to quantize Co more aggressively.

Results

By using different QP values for the luma channel, as well as the Co and Cg component channels when coding video data, the encoder 20 may be able to reduce an amount of S-CIELAB delta-E error present in reconstructed imaged decoded by the decoder 30 using coding video data from the encoder 20.

Figure 9:
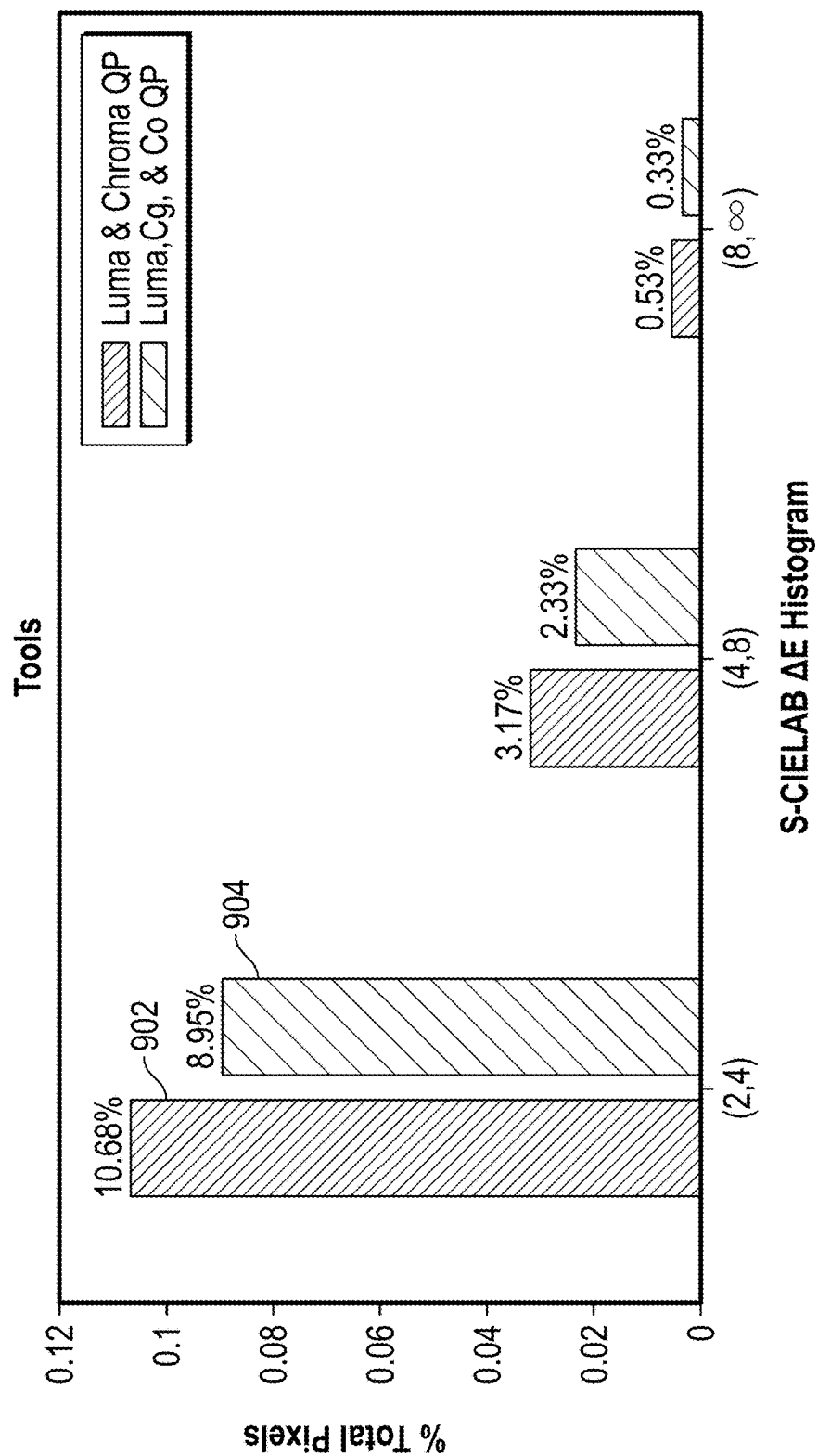
FIG. 9 shows a bar graph illustrating an amount of S-CIELAB delta-E error present in reconstructed images coded using separate luma and chroma QP values, and separate luma, Co, and Cg QP values, in accordance with some embodiments.

FIG. 9 shows a bar graph illustrating an amount of S-CIELAB delta-E error present in reconstructed images coded using separate luma and chroma QP values, and separate luma, Co, and Cg QP values, in accordance with some embodiments. The graph of FIG. 9 shows an x-axis having three different S-CIELAB delta-E error ranges, a first range [2, 4), a second range [4, 8), and a third range [8, ∞). For scaling purposes, the error range [0, 2) has been omitted from the graph of FIG. 9. The graph also shows a y-axis that indicates a percentage of the total pixels of a coded video image having S-CIELAB delta-E error falling within the various error ranges indicated on the x-axis.

As used herein, a reconstructed image generally refers to an image reconstructed by the decoder 30 from a video data bitstream encoded by the encoder 20 from an original source image (using QP values as determined by the rate controller 120, 420, or 620). Bars 902 of the graph of FIG. 9 illustrate the percentage of pixels of a reconstructed image from a particular source image having an S-CIELAB delta-E value within each of the error ranges indicated on the x-axis, using separate luma QP values 402 and chroma QP values 406 (e.g., as determined by the rate controller 420). Bars 904 illustrate the percentage of pixels of a reconstructed image from the same source image having an S-CIELAB delta-E value within each of the error ranges indicated on the x-axis, wherein separate luma QP values 402, Cg QP values 606, and Co QP values 608 are used (e.g., as determined by the rate controller 620). As can be seen from the graph of FIG. 9, bars 902 have values of 10.68%, 3.17%, and 0.53% for the error ranges [2, 4), [4, 8), and [8, ∞), respectively. On the other hand, bars 904 have respective values of 8.95%, 2.33%, and 0.33%. Thus, by using the rate controller 620 to determine Co and Cg QP values separately, a total amount of S-CIELAB delta-E in the coded video data may be reduced.

Figure 10:
FIG. 10 shows S-CIELAB delta-E error maps for an image coded using separate luma and chroma QP values, and using separate luma, Co, and Cg QP values.
Figure 10:
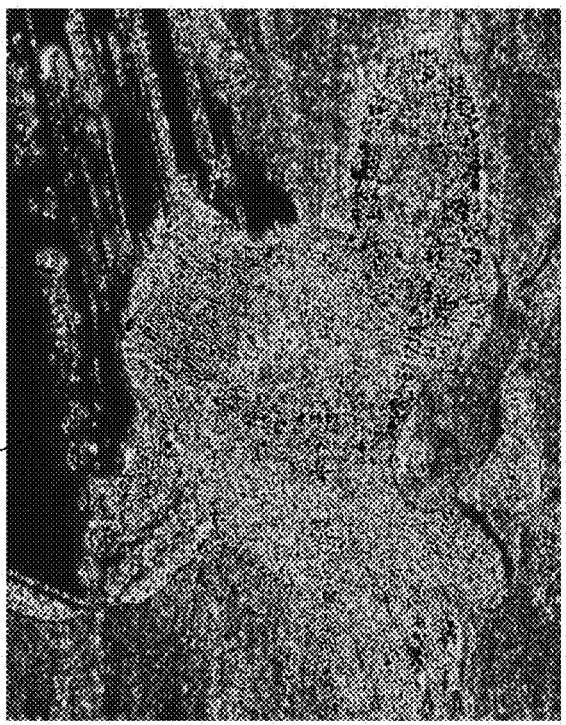

FIG. 10 shows S-CIELAB delta-E error maps for an image coded using separate luma and chroma QP values, and using separate luma, Co, and Cg QP values. The error map 1002 corresponds to coded video data using separate luma and chroma QP values (e.g., as determined by the rate controller 420 of FIG. 4). The error map 1004 corresponds to coded video data using separate luma, Co, and Cg QP values (e.g., as determined by the rate controller 620 of FIG. 6). The error maps 1002 and 1004 comprise regions of different colors. For example, blue regions represent areas of reconstructed images of the coded video data having low delta-E error, while red areas represent areas of the reconstructed images having high delta-E error. As can be seen from FIG. 10, the error map 1004 may contain fewer red areas in comparison to the error map 1002. This shows that the encoder 20, when coding video data using separate Co and Cg QP values, may be able to code video data resulting in reconstructed images having lower S-CIELAB delta-E error.

Process Flow

Figure 11:
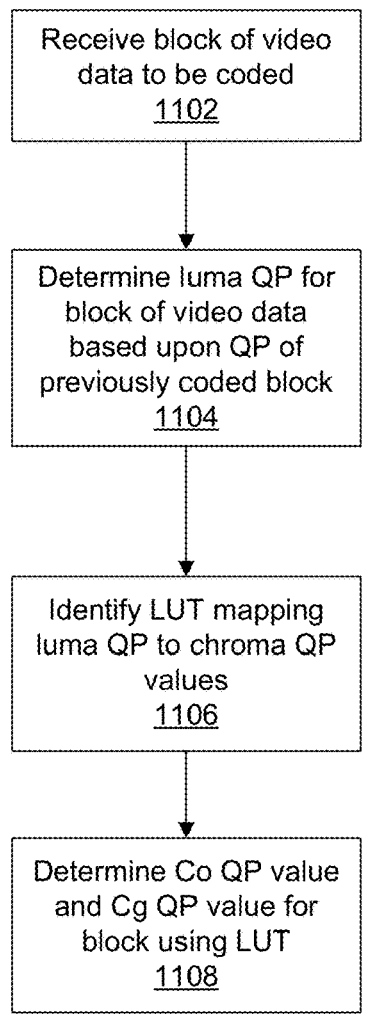
FIG. 11 shows a flowchart illustrating an exemplary process for determining QP values for coding a block of video data.

FIG. 11 shows a flowchart illustrating an exemplary process for determining QP values for coding a block of video data. At block 1102, the encoder 20 receives a block of video data to be coded. In some embodiments, the encoder 20 may code the block of video data using the YCoCg color space, wherein the Y component may be referred to as the luma component, and the Co and Cg components may be referred to as chroma components.

At block 1104, the rate controller 620 of the encoder 20 determines a luma QP for the block of video data, based upon a determined QP value for a previously coded block of video data. In some embodiments, the rate controller 620 may determine the luma QP further based upon a measure of buffer fullness of the buffer 150, a determination of whether a complex to flat transition exists in the current block (as determined by the flatness detector 115), and/or the like.

At block 1106, the rate controller 620 identifies an LUT or other data structure 604 mapping luma QP values to chroma QP values. In some embodiments, the LUT 604 may comprise a first set of mappings mapping luma QP values to Co QP values, and a second set of mappings mapping luma QP values to Cg QP values. In some embodiments, the Co and Cg QP values may be more coarse than the corresponding luma QP values (e.g., have higher QP values). In some embodiments, for a given luma QP value, the corresponding Co QP value will be greater than or equal to the corresponding Cg QP value.

At block 1108, the rate controller 620 determines QP values of the Co and Cg color components for the block of video data, using the determined luma QP value and the identified LUT 604. The determined luma QP, Co QP, and Cg QP may then be used by the encoder 20 to code the block of video data. The encoder 20 may transmit the video data coded using the determined luma QP, Co QP, and Cg QP values as part of a video data bitstream (e.g., to the decoder 30 on the destination device 14, via the link 16). For example, the decoder may receive the video data bitstream contain the video data coded using the determined luma QP, Co QP, and Cg QP values, and decode the received video data for display.

In addition, in some embodiments, the determined luma QP may be used as a previous QP value by the rate controller 620 for determining a luma QP value for a subsequent block of video data.

The above embodiments may provide several advantages and benefits, including reducing visible artifacts in static flicker testing for worst-case content in DSC. In addition, the proposed solution may require only minimal changes to existing DSC codecs, and may cause only a negligible increase in hardware complexity.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. An apparatus for coding video data using display stream compression, comprising:
    an encoder configured to code a current block of video data using the YCoCg color space comprising a luma channel, a chrominance orange (Co) channel, and a chrominance green (Cg) channel; and
    a rate controller comprising a hardware processor, the rate controller configured to:
        determine a luma quantization parameter (QP) for quantizing the luma channel of the current block of video data; and
        based upon the determined luma QP, determine a Cg QP for quantizing the Cg channel of the current block of video data and a Co QP for quantizing the Co channel of the current block of video data, wherein the Cg QP and the Co QP are greater than the luma QP, and wherein the rate controller is configured to determine the Co QP such that the Co QP will always be greater than the Cg QP;
    wherein the encoder is configured to encode the current block of video data based upon the determined luma QP, Co QP, and Cg QP to form a video data bitstream for display or transmission.

2. The apparatus of claim 1, wherein the encoder encodes the current block of video data by determining a luma quantization step size, a Co quantization step size, and a Cg quantization step size, based upon the determined luma QP, Co QP, and Cg QP, wherein the Co quantization step size is larger than the Cg quantization step size, and the Cg quantization step size is larger than the luma quantization step size.

3. The apparatus of claim 1, wherein the luma QP is determined by adjusting a luma QP value of a previously coded block of video data by an adjustment value, the adjustment value being based upon a number of bits used to code the previously coded block and a target number of bits for coding the current block of video data.

4. The apparatus of claim 3, wherein the adjustment value is further based at least in part upon a buffer fullness state of a buffer, such that the luma QP is higher for higher buffer fullness values.

5. The apparatus of claim 3, wherein the adjustment value is proportional to a difference between the number of bits used to code the previously coded block and the target number of bits.

6. The apparatus of claim 1, wherein the luma QP is set to a predetermined value in response to a determination of whether the current block of video data comprises a complex region to flat region transition.

7. The apparatus of claim 1, wherein the rate controller is configured to access a data structure comprising predetermined mappings from a plurality of luma QP values to a plurality of corresponding Co QP and Cg QP values.

8. The apparatus of claim 7, wherein the data structure comprises at least one look-up table (LUT) comprising a first column mapping luma QP values to Co QP values, and a second column mapping luma QP values to Cg QP values.

9. The apparatus of claim 1, wherein the encoder is further configured to transmit the video data bitstream to a decoder to be displayed on a display device.

10. An method for coding video data using display stream compression, comprising:
    receiving a current block of video data to be coded using the YCoCg color space comprising a luma channel, a chrominance orange (Co) channel, and a chrominance green (Cg) channel;
    determining a luma quantization parameter (QP) for quantizing the luma channel of the current block of video data;
    based upon the determined luma QP, determining a Cg QP for quantizing the Cg channel of the current block of video data and a Co QP for quantizing the Co channel of the current block of video data, wherein the Cg QP and the Co QP are greater than the luma QP, and wherein determining the Co QP comprises determining the Co QP such that the Co QP will always be greater than the Cg QP;
    encoding the current block of video data based upon the determined luma QP, Co QP, and Cg QP to form a video data bitstream for display or transmission.

11. The method of claim 10, wherein the current block of video data is encoded by determining a luma quantization step size, a Co quantization step size, and a Cg quantization step size, based upon the determined luma QP, Co QP, and Cg QP, wherein the Co quantization step size is larger than the Cg quantization step size, and the Cg quantization step size is larger than the luma quantization step size.

12. The method of claim 10, wherein the luma QP is determined by adjusting a luma QP value of a previously coded block of video data by an adjustment value, the adjustment value being based upon a number of bits used to code the previously coded block and a target number of bits for coding the current block of video data.

13. The method of claim 12, wherein the adjustment value is further based at least in part upon a buffer fullness state of a buffer, such that the luma QP is higher for higher buffer fullness values.

14. The method of claim 12, wherein the adjustment value is proportional to a difference between the number of bits used to code the previously coded block and the target number of bits.

15. The method of claim 10, further comprising setting the luma QP to a predetermined value in response to a determination of whether the current block of video data comprises a complex region to flat region transition.

16. The method of claim 10, further comprising accessing a data structure comprising predetermined mappings from a plurality of luma QP values to a plurality of corresponding Co QP and Cg QP values.

17. The method of claim 16, wherein the data structure comprises at least one look-up table (LUT) comprising a first column mapping luma QP values to Co QP values, and a second column mapping luma QP values to Cg QP values.

18. The method of claim 10, further comprising: transmitting the video data bitstream to a decoder to be displayed on a display device.

19. An apparatus for coding video data using display stream compression, comprising:
  means for receiving a current block of video data to be coded using the YCoCg color space comprising a luma channel, a chrominance orange (Co) channel, and a chrominance green (Cg) channel;
  means for determining a luma quantization parameter (QP) for quantizing the luma channel of the current block of video data;
  means for based upon the determined luma QP, determining a Cg QP for quantizing the Cg channel of the current block of video data and a Co QP for quantizing the Co channel of the current block of video data, wherein the Cg QP and the Co QP are greater than the luma QP, and wherein the means for determining the Co QP comprises means for determining the Co QP such that the Co QP will always be greater than the Cg QP;
  means for encoding the current block of video data based upon the determined luma QP, Co QP, and Cg QP to form a video data bitstream for display or transmission.

20. The apparatus of claim 19, wherein the means for encoding the current block of video data encodes the current block of video data based upon a luma quantization step size, a Co quantization step size, and a Cg quantization step size, derived respectively from the determined luma QP, Co QP, and Cg QP, wherein the Co quantization step size is larger than the Cg quantization step size, and the Cg quantization step size is larger than the luma quantization step size.

21. The apparatus of claim 19, wherein means for determining the luma QP determines the luma QP is configured to determine the luma QP by adjusting a luma QP value of a previously coded block of video data by an adjustment value, the adjustment value being based upon a number of bits used to code the previously coded block and a target number of bits for coding the current block of video data.

22. The apparatus of claim 21, wherein the adjustment value is further based at least in part upon a buffer fullness state of a buffer, such that the luma QP is higher for higher buffer fullness values.

23. The apparatus of claim 19, wherein the means for determining the luma QP sets the luma QP to a predetermined value in response to a determination of whether the current block of video data comprises a complex region to flat region transition.

24. The apparatus of claim 19, further comprising accessing a data structure comprising predetermined mappings from a plurality of luma QP values to a plurality of corresponding Co QP and Cg QP values.

25. The apparatus of claim 19, further comprising means for transmitting the video data bitstream to a decoder to be displayed on a display device.

* * * * *